Aug. 28, 1956  E. HITZELBERGER  2,760,221
DRIVING DEVICE FOR WINDSHIELD WIPER
Filed June 27, 1950   2 Sheets-Sheet 1

Inventor
Erwin Hitzelberger
By Dickel and Padlon
Attorneys

Aug. 28, 1956          E. HITZELBERGER          2,760,221
DRIVING DEVICE FOR WINDSHIELD WIPER
Filed June 27, 1950          2 Sheets-Sheet 2
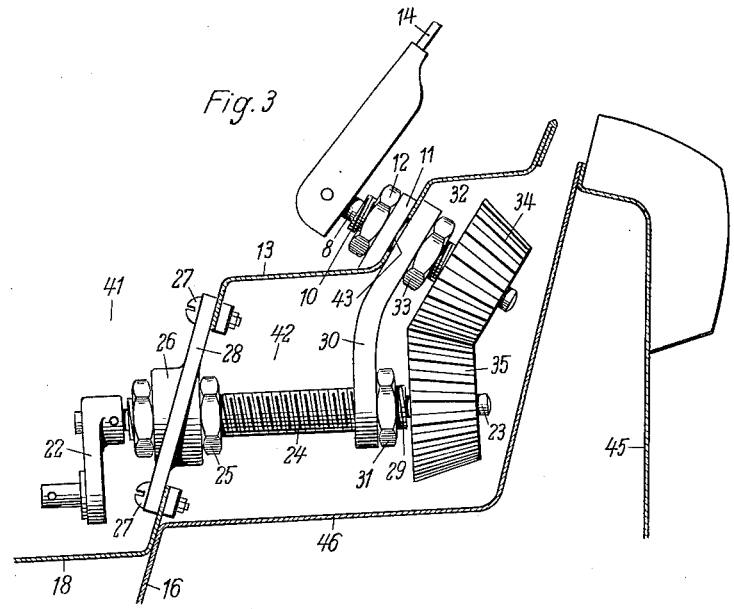
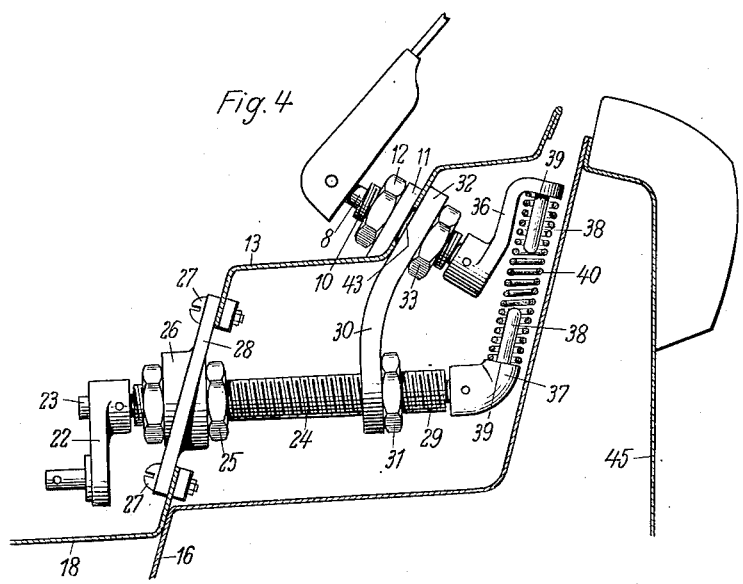
Inventor
Erwin Hitzelberger
By Wicke and Padlon
Attorneys

United States Patent Office 2,760,221
Patented Aug. 28, 1956

2,760,221

DRIVING DEVICE FOR WINDSHIELD WIPER

Erwin Hitzelberger, Stuttgart-Rohr, Germany, assignor to Daimler-Benz Aktiengesellschaft, Stuttgart-Unterturkheim, Germany Application June 27, 1950, Serial No. 170,525

Claims priority, application Germany June 27, 1949

7 Claims. (Cl. 15—253)

The invention refers to a driving device for windshield wipers on vehicles, and particularly to windshield wipers of motor vehicles, whereby provision can be made for one or several windshield wipers, which are driven by one or several driving motors, for example, directly or by means of rods.

An object of the present invention is to provide means for the installation and removal of the windshield wiper, as well as of its driving device. A further object is to provide a windshield wiper driving device, whose arrangement is such that the installation and removal of the same can be done without the necessity of carrying out any work from the inside of the vehicle or loosening or removing any parts therefrom, as for example the instrument board.

In accordance with the above and other objects it is an essential characteristic of the invention that the driving device or parts thereof can be fastened from the outside through an opening in the wall of the car body, as for example, in the dash of a motor vehicle and can be fastened onto the inside of the car body through such opening.

Figure 1:
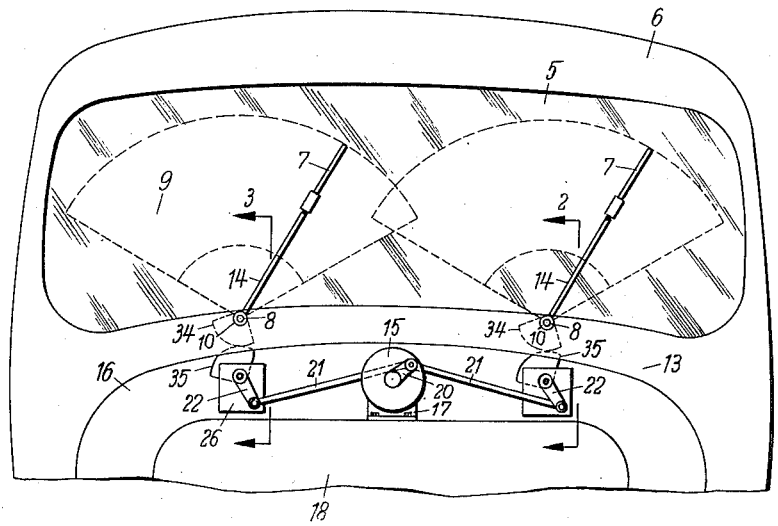
Figure 2:
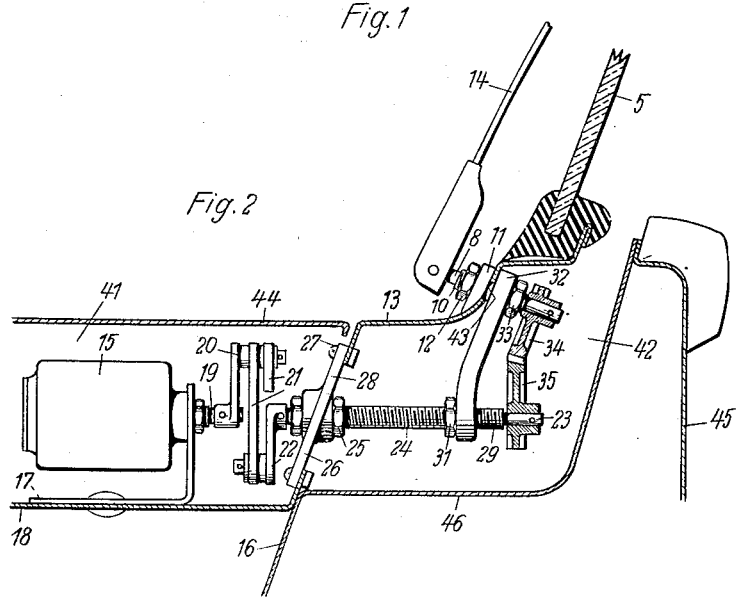

Further objects, characteristics and features of the present invention will become more obvious from the following description when taken in connection with the accompanying drawing which shows for purposes of illustration only several preferred embodiments in accordance with the present invention, and wherein:

Figure 1 shows the front view arrangement of the windshield wipers and of their driving device on the windshield of a vehicle, Figure 2 shows the construction of the windshield wiper driving device on a larger scale taken on line 2—2 of Figure 1; and Figures 3 and 4 show modified forms of construction respectively of the windshield wiper driving device taken on line 3—3 of Figure 1.

Two windshield wipers 7 are arranged in the usual and well known manner at a distance from each other on the windshield 5 of a motor vehicle gear body 6 so that each of the windshield wipers serves a sufficiently large sector 9 of the windshield during its swinging motion around the wiper axle or shaft 8. The wiper axles or shafts 8 are arranged in a revolving manner below the windshield in bushings 10, which are provided with an outside or external screw thread and are firmly connected to the external wall 13 of the car body by means of screw nuts 12, employing a fitting piece or washer 11. The drive of the arms of the wiper 14 is carried out by a joint driving electric motor 15 which is arranged in the longitudinal central plane of the vehicle in front of the dash 16 of the car body and is fastened in a removable manner to an engine installation or panel 18 of the dash of the car body. The rotary motion of the motor shaft is converted into an oscillatory motion swinging to and fro of the two intermediate levers 22 by means of a crank 20 and two push rods 21 fastened thereto. The intermediate levers 22 are securely mounted on one jack shaft 23 each. The crank 20, the push rods 21 and the intermediate levers 22 are also located in front of the dash 16 of the car body. The jack shafts 23 are rotatably supported in bushings 24, which are provided with an outside screw thread and are fastened in an adjustable manner by means of the screw nut 25 at each base plate 26. The base plates 26 are connected to the dash 16 of the car body in an easily removable manner by means of screws 27 and are arranged on the front side of the dash 16 so that they cover two assembly openings 28 in the dash 16. Each of the bushings 24 carries at its inner end 29 an angular holder 30 which threadably engages the external thread provided on bushing 24 and which is thereby mounted on and fastened to the bushing 24 in an adjustable manner by means of the threaded engagement thereof with the outside or external thread of the bushing 24 and by means of a locking nut 31. Finally, bushings 10 which are also provided with external threads, threadably engage the internal threaded bores provided in the upper or opposite ends 32 of the angular holders 30 whereby the bushings 10 support the wiper axles or shafts 8. The bushings 10 may be adjusted in the longitudinal or axial direction thereof by means of the outside threads or screw of the bushing 10 and the locking nut 33 each.

The power transmitting connection between the wiper shafts 8 and the intermediate shafts 23 is realized by means of bevel gear wheels or bevel gear wheel segments 34 and 35 which may be formed as pinions, as shown in Figure 2, or may be formed as friction wheels, as shown in Figure 3.

In the embodiment illustrated in Figure 4 the power transmitting connection is realized by means of radial shoulders 36 and 37, fastened to the inner ends of shafts 8 and 23 respectively, which shoulders 36 and 37 are provided with guide pins 38 respectively. Each shoulder 36 and 37 also forms an abutment surface 39 against which the ends of the helical spring 40 supports themselves. The helical spring 40 provides a coupling of the two shafts 8 and 23 which is flexible and free from rattling but gives sufficient power connection with a sufficient rating of the strength of the spring. On the other hand, a simple and fast assemblage of the driving device and a compensation of eventual inaccuracies in the mutual position are made feasible by means of the spring.

Prior to the installation of the windshield wiper driving device in the vehicle, the parts 8, 10, 22 through 26, 30, 31 and 33, and either 34 and 35 or 36 to 40 are first assembled separately outside the car body in an installation group and the assembly is then installed as a whole from the engine or luggage space 41 through the opening 28 into the channel 42, which is arranged below the windshield 5. Simultaneously the foremost end of the bearing bushing 10 is inserted from the inside of the airing channel 42 through an opening 43 in the outside wall of the car body and the whole assembly is then fastened to the car body by means of the screws 27 and the screw nut 12. It is then only necessary to connect the intermediate levers 22 with the crank 20 of the driving device 15 by means of push rods 22 and to connect the wiper arms 7 with the respective axles or shafts 8 to establish a driving connection between the motor 15 and the windshield wipers 14.

The described construction and arrangement of the details of the driving device results not only in a simple assemblage and installation of the device but also provides for a vast compensation of manufacturing or assemblage inaccuracies. Also there is provided by the invention an opportunity for constant control and maintenance of the device, since all this work can be easily carried out after lifting the hinged engine or luggage hood 44 without necessitating the removal of any parts in the interior of the car body, such as for example the instrument board 45 and the wall 46 of the channel 42, particularly since the access to the space between the instrument board and the dash of the car body is mostly blocked by the indicator devices and their leads, which are usually located there.

The application of the invention is not restricted to the illustrated and described forms of construction of the driving device for windshield wipers. It can also be applied where the driving engine for the windshield wipers is arranged behind the car body dashboard in the interior space of the car body, or where a windshield wiper is immediately driven separately by an extra motor with shaft rotating to and fro.

While a preferred embodiment of the invention is disclosed, it is to be understood that modification as to form, arrangement and use of materials may be made without departing from the spirit and scope of the invention as claimed.

What I claim is:

1. A driving device for windshield wipers of motor vehicles having a windshield, a transverse wall extending downwardly from the lower edge of said windshield and having an offset portion defining a space, drive means including means for producing oscillatory movement for the windshield wiper, said drive means being located only forwardly of said wall, said transverse wall being provided with at least two openings, a pre-assembled motion transmitting means located in said space and extending through said openings for transmitting oscillatory movement from said drive means to said windshield wiper, and means for securing said motion transmitting means in its position in said space only from the outside of said space and from in front of said wall.

2. The combination according to claim 1, wherein said securing means consists only of screws and a single nut.

3. A driving device for windshield wipers of motor vehicles having a windshield, an external body wall adjacent the lower edge of said windshield passing into a substantially transverse vertical wall, a hood in front of said transverse wall, windshield-wiper drive means including means for converting the rotary motion of said drive means into oscillatory motion, said drive means being located under said hood forwardly of said transverse wall, said external body wall and said transverse wall being each provided with at least one opening, a pre-assembled motion transmitting means interconnecting said converting means with the windshield wiper, said pre-assembled motion transmitting means being inserted as a unit through the opening in said transverse wall into the space located therebehind, means located only on the outside of said body wall and said transverse wall for securing said pre-assembled motion transmitting means in said space in the final position thereof, said motion transmitting means extending in the final position thereof through said openings in said body wall and in said transverse wall, and including a driving axle for the windshield wiper extending into said space through the opening in said body wall, an intermediate shaft connected at the forward end thereof with said converting means and extending rearwardly into said space through the opening in said transverse wall, interconnecting means on the ends of said driving axle and said intermediate shafts in said space for transmitting the oscillatory motion of said intermediate shaft to said driving axle, and bearing means in said pre-assembled motion transmitting means for supporting the same in said body wall and said transverse wall.

4. The combination according to claim 3, wherein said bearing means includes two bushings, one of said bushings surrounding said driving axle and the other of said bushings surrounding said intermediate shaft, an angular holder provided with threaded bores near the ends thereof, said one bushing threadably engaging one of said bores and the other bushing threadably engaging the other of said bores, lock nut means for locking together said holder and said bushings, a plate mounted on said other bushing, and means including two nuts located on opposite sides of said plate for securing said plate on said other bushing, said plate simultaneously serving as closure member for the opening in said transverse wall and being secured thereto externally by said screws.

5. The combination according to claim 3, wherein said interconnecting means comprises meshing gear pinions.

6. The combination according to claim 3, wherein said interconnecting means comprises friction wheels.

7. The combination according to claim 3, wherein said interconnecting means comprises a radial shoulder including a guide pin provided on said driving axle and said intermediate shaft, said guide pins being directed against each other, and spring means abutting against said shoulders and carried by said guide pins.

References Cited in the file of this patent

UNITED STATES PATENTS

| 1,719,444 | Oishei | June 2, 1929 |
| 2,046,171 | Lauer | June 30, 1936 |
| 2,270,589 | Hansen | Jan. 20, 1942 |
| 2,298,197 | Coffey | Oct. 6, 1942 |

FOREIGN PATENTS

| 408,318 | Great Britain | Apr. 9, 1934 |
| 841,385 | France | Feb. 6, 1939 |